(12) United States Patent
Pero (10) Patent No.: US 12,525,761 B2
(45) Date of Patent: Jan. 13, 2026

(54) OPTICAL PLATFORM WITH TRANSLATION AND ROTATION

(71) Applicant: Michael J. Pero, King George, VA (US)

(72) Inventor: Michael J. Pero, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 605 days.

(21) Appl. No.: 17/990,212

(22) Filed: Nov. 18, 2022

(65) Prior Publication Data

US 2024/0170908 A1    May 23, 2024

(51) Int. Cl.
*H01S 3/02*    (2006.01)

(52) U.S. Cl.
CPC ..................... *H01S 3/02* (2013.01)

(58) Field of Classification Search
CPC .......... H01S 3/02; G01M 11/04; G02B 7/004
See application file for complete search history.

(56) References Cited

U.S. PATENT DOCUMENTS

| 7,535,936 | B2* | 5/2009 | Day .................. H01S 5/02415 |
| | | | 372/101 |
| 2004/0025358 | A1* | 2/2004 | Jan ........................ G01C 15/12 |
| | | | 33/286 |
| 2022/0403466 | A1* | 12/2022 | Lundquist .......... G01N 21/6456 |

FOREIGN PATENT DOCUMENTS

CN        214079856 U   *  8/2021

OTHER PUBLICATIONS

Translation of CN 214079856 (Year: 2021).*

* cited by examiner

*Primary Examiner* — Xinning(Tom) Niu
(74) *Attorney, Agent, or Firm* — Gerhard W. Thielman (57) ABSTRACT

A platform is provided for aligning and securing an instrument, and being attachable to a mount stand. The platform angularly aligns plural independent and parallel rotations separated by linear offset. The platform includes first and second plates, first and second disks and a translational interface. The first plate attaches to the mount stand. The first disk is disposed onto the first plate and can rotate on a first axis. The linear translation assembly includes a block flanked by a pair of flanges. Each flange is disposed on the first disk. The second disk is disposed onto the block and can rotate on a second axis parallel to the first axis. The block slides to translate relative to the pair of flanges. The second plate attaches to the second disk and receives the instrument.

14 Claims, 14 Drawing Sheets

OPTICAL PLATFORM WITH TRANSLATION AND ROTATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to off-axis alignment. In particular, the invention relates to platform rotation along independent parallel axes that can be laterally offset by translation.

Laboratory testing of lasers involve use of mirrors and beamsplitters to provide proper alignment and measurement. Such configurations include off-axis parabolic optical testing. Thorlabs in Newton, NJ provides various mechanisms to enable mounting lasers and ancillary equipment onto a platform for such alignment.

Conventional adjustment methods for translating along a specified axis include manually rotating the translational stage to the desired angle of the linear translation axis. Accuracy of angle is decreased with this method due to manual application of a protractor to measure the angle between the adjustment stage and a reference line, introducing considerable measurement error. Hence, stability of optical alignment is decreased because the axis angle is secured by a single tensioned bolt.

SUMMARY

Conventional laser alignment systems yield disadvantages addressed by various exemplary embodiments of the present invention. In particular, various exemplary embodiments provide a platform for aligning and securing an instrument, and being attachable to a mount stand. The platform angularly aligns plural independent and parallel rotations separated by linear offset. The platform includes first and second plates, first and second disks and a translational interface.

In exemplary embodiments, the first plate attaches to the mount stand. The first disk is disposed onto the first plate and can rotate on a first axis. The linear translation assembly includes a block flanked by a pair of flanges. Each flange is disposed on the first disk. The second disk is disposed onto the block and can rotate on a second axis parallel to the first axis. The block slides to translate relative to the pair of flanges. The second plate attaches to the second disk and receives the instrument.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 7A, 7B, 7C and 7D are plan views of the platform with translation and rotation;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches ("), mass in grams (g), time in seconds (s), angles in degrees (°), and force in newtons (N). Supplemental measures can be derived from these, such as density in grams-per-cubic-centimeters (g/cm$^3$), moment of inertia in gram-square-centimeters (kg-m$^2$) and the like.

Exemplary embodiments of an optical platform are provided to enable dual independent rotation of a laser on a test stand, as well as linear translation in a convenient configuration. The exemplary optical platform has also been referred to as a Rotating Axis Translational Optical Adjuster that enables precision linear translation along a rotationally variable axis.

By contrast, to perform precision linear translation along a variable axis with conventional Thorlabs adjusters, two rotational adjusters and one translational adjuster would need to be stacked with the rotational adjusters sandwiching the translational adjuster. This results in excessive height as well as component interferences between adjusters, thereby rendering this possibility unfeasible. No conventional optical adjusters can provide strict linear translation along a specific angle. Further, inherent measurement errors in conventional techniques render them unsuitable for OAP alignments.

Figure 1A:
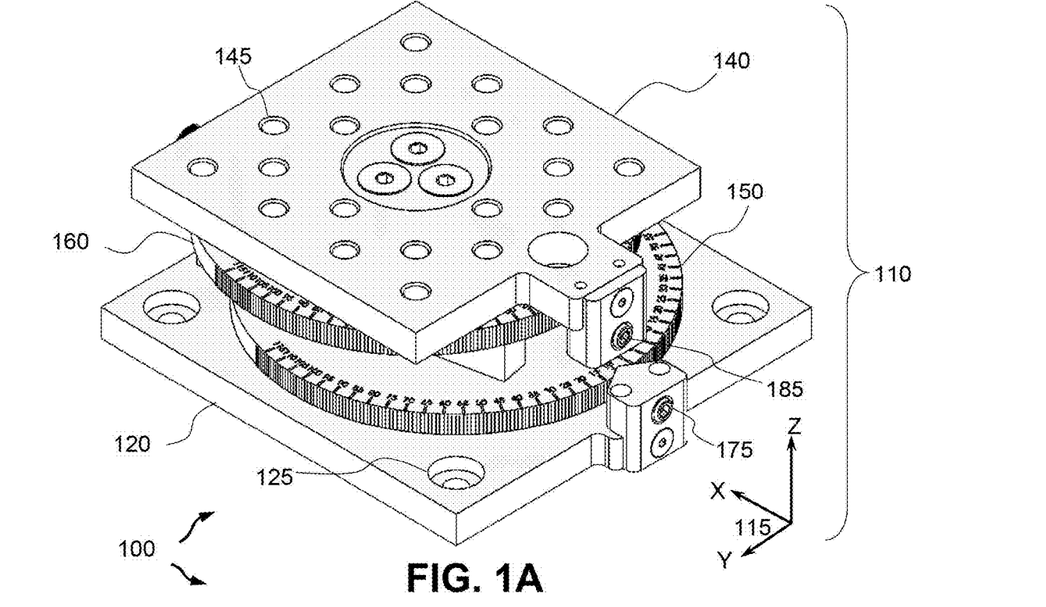
FIGS. 1A and 1B are perspective assembly views of an exemplary platform.
Figure 1B:
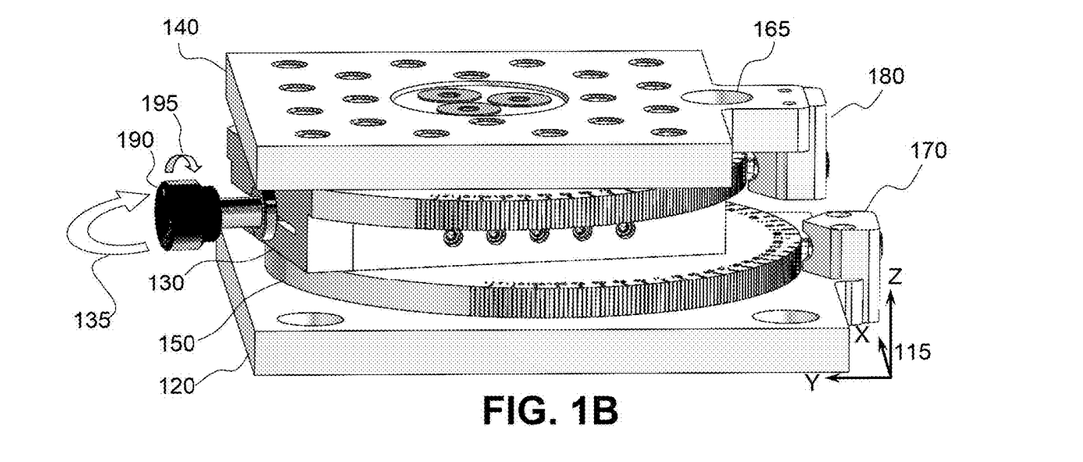
Figure 1C:
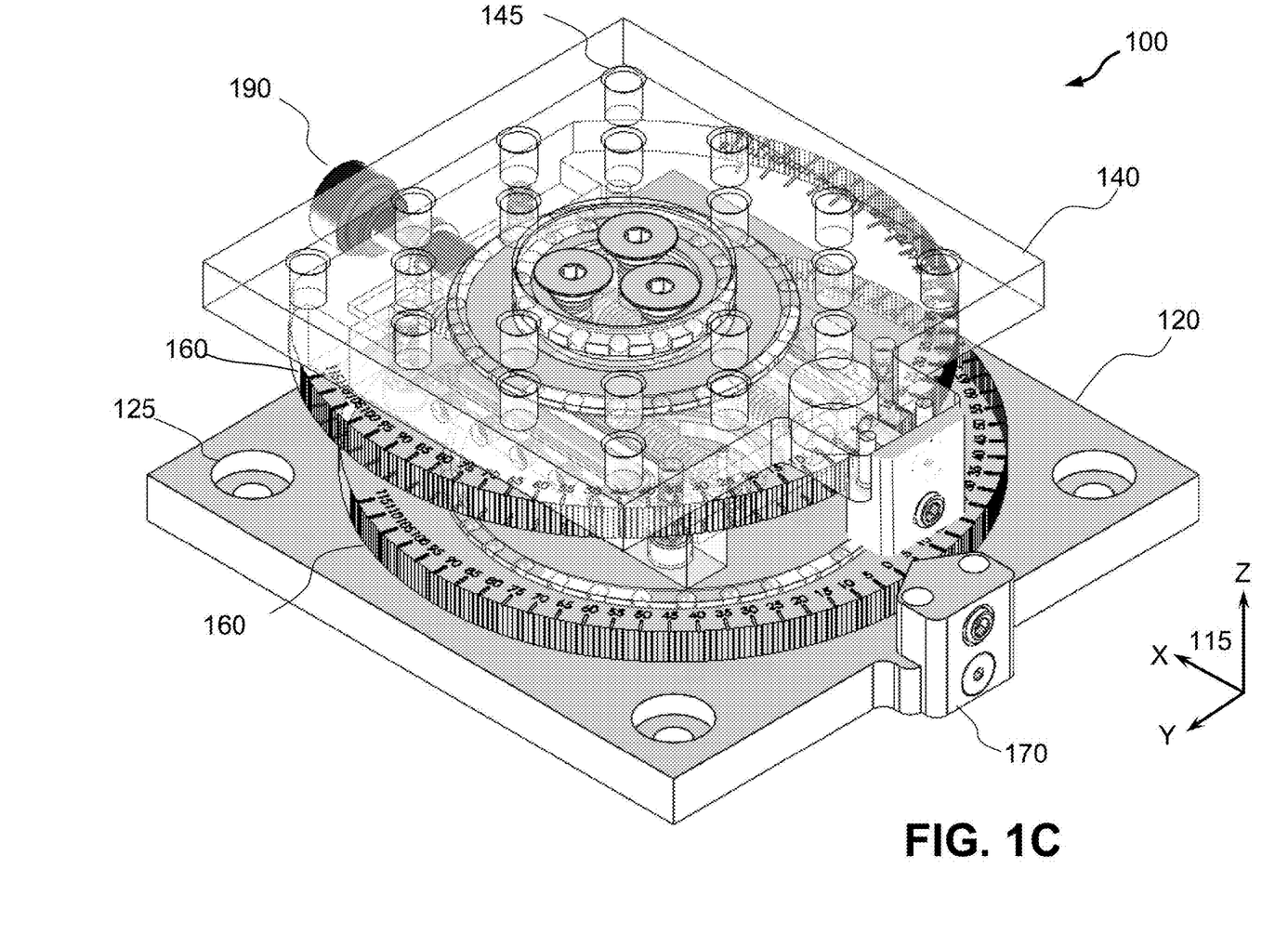
FIG. 1C is a perspective assembly view of the platform with select transparency.

FIGS. 1A, 1B and 1C show perspective assembly views 100 of an exemplary optical platform 110 oriented geometrically with Cartesian coordinates 115 (also referred to as a compass rose). In particular, the X-axis denotes the indicator axial direction, the Y-axis the lateral horizontal direction, and the Z-axis the stack vertical direction. A bottom plate 120 mounts to a laser test stand via vertical holes 125. A translational interface subassembly 130 provides lateral movement and can swing along an arc 135 about the vertical (i.e., Z direction).

A top plate 140 (shown in partial transparency in FIG. 1C) provides a surface onto which an instrument can be attached via vertical holes 145 in a standard pattern. Surfaces for the plates 120 and 140 can be treated as external or obverse and internal or reverse. In this context, the bottom plate 120 outwardly faces downward in relation to the Z-axis, while the top plate 140 outwardly faces upward in that relation. As examples used for laboratory testing, the bottom plate 150 measures 5" on each square side, while the top plate 140 measures 4" on each square side. The platform 110 can be composed from steel and can weigh about 7.2 $lb_m$.

A lower indicator disk 150 is disposed between the bottom plate 120 and the subassembly 130. An upper indicator disk 160 is disposed between the subassembly 130 and the top plate 140, which includes a cavity window 165 through which to view markings on the upper disk 160. To facilitate manufacture, a lower pointing flange 170 attaches to the bottom plate 120 and includes a set screw 175 to inhibit the lower disk 150 from turning when tightened.

Similarly, an upper pointing flange 180 attaches to the top plate 140 and includes a set screw 185 to inhibit the upper disk 160 from turning when tightened. A swing arm 190 supplied from Thor Labs enables the subassembly 130 to rotate along the arc 135 in relation to the bottom plate 120. The arm 190 can turn clockwise, for example about its axis along spin rotation 195.

Figure 2:
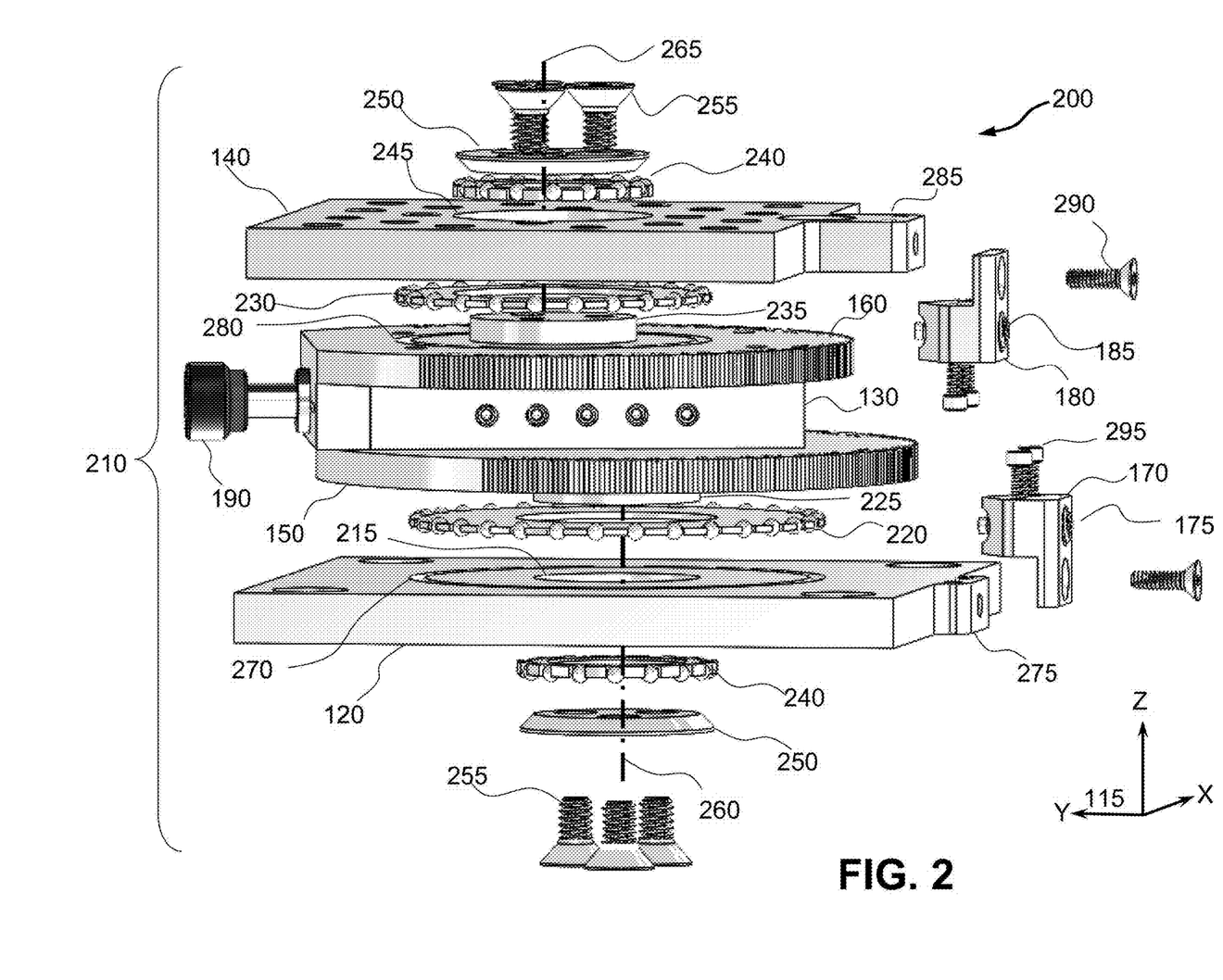
FIG. 2 is a perspective exploded view of the platform components.

FIG. 2 shows an exploded view 200 of components 210 to the optical platform 110. The bottom plate 120 includes a lower insertion chamfer hole 215 in the center. Lower ball bearings 220 (such as optionally mounted to an annular washer) are disposed between the bottom plate 120 (on its inward reverse face) and the lower disk 150, which has an axial rotation guide 225 extending outward (i.e., vertically downward).

Upper ball bearings 230 (such as optionally mounted to an annular washer) are disposed between the upper disk 160 and the top plate 140 (on its inward reverse face), which has an axial rotation guide 235 extending outward (i.e., vertically upward). Upper and lower sets of ball bearings 240 can be inserted into the chamfer hole 215 of the bottom plate 120 and into an upper insertion chamfer hole 245 of the top plate 140.

Circular frustum inserts 250 can be vertically inserted into the holes 215 and 245 respectively from below and above their respective bottom and top plates 120 and 140 (i.e., from their external obverse faces). A triplet of countersunk vertical bevel screws 255 secure the inserts 250 into their respective rotation guides 225 and 235 of the lower and upper disks 150 and 160.

The screws 255 include a hexagonal cavity for securing or removing by a 4 mm allen wrench. Note that the inserts 250 turn their respective disks 150 and 160 on associated vertical and parallel axes 260 and 265. The bottom plate 120 includes an annular race 270 around the hole 215 into which the bearings 220 can roll and support the lower disk 150. The bottom plate 120 further includes an extension flange 275 onto which the lower indicator 170 attaches.

The upper disk 160 includes an annular race 280 around the hole 245 into which the bearings 230 can roll and permit separation from the upper disk 160. Although not explicitly depicted in these drawings, counterpart races for the bearings 220 and 230 are also provided under the lower disk 150 and under the top plate 140 (on the inner reverse face). The top plate 140 further includes an extension flange 285 onto which the upper indicator 180 attaches. In other exemplary embodiments, the indicators 170 and 180 can be unitarily joined to their respective plates 120 and 140. However, for manufacturing simplicity, these can also be separate components and joined together with axial bevel screws 290 and vertical hexagonal screws 295.

Figure 3:
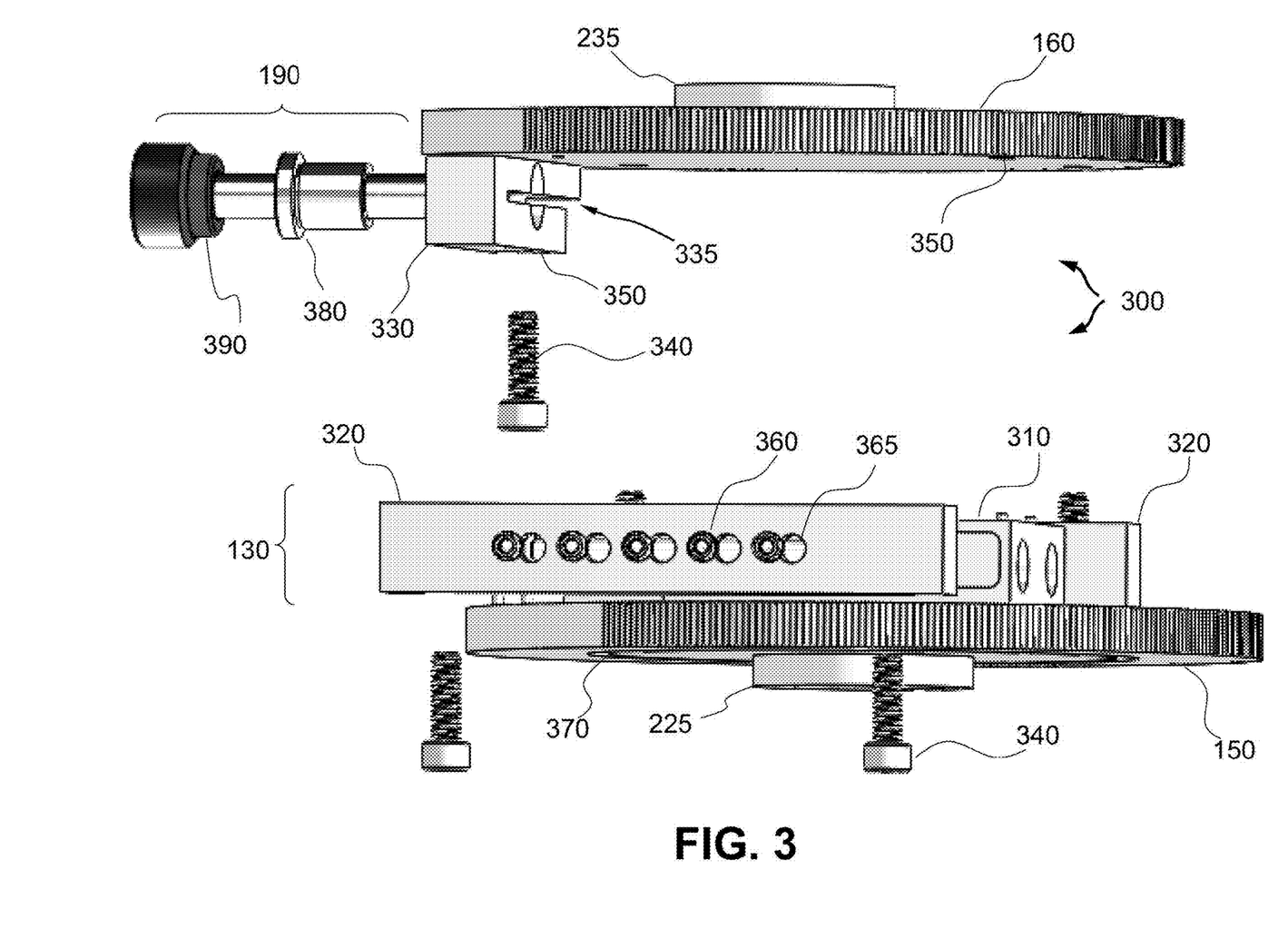
FIG. 3 is a perspective exploded view of the disks and interface subassembly from the side.

FIG. 3 shows an exploded view 300 of indicator disks 150 and 160 that sandwich an exploded translational subassembly 130. A midblock 310 is flanked by end flange assemblies 320. An adjustment extension 330 integrally connected to the upper disk 160 includes a partial slot 335. In the exemplary configuration, the lower disk 150 and the midblock 310 constitute a lower integral component the upper disk 160; also the extension 330 constitute an upper integral component, although these arrangements are not limiting. The proximal end of the arm 190 inserts into the extension 330. A vertical hexagonal bolt screw 340 inserts into vertical holes 350 of the extension 330 to tighten the slot 335 for fixing swing angle of the arm 190.

Both flange assemblies 320 include compression inserts 360 that insert into a lateral set of corresponding threaded cavities 365. The upper disk 160 includes an annular race 370 on its reverse face to accommodate the upper bearings 230. The swing arm 190 comprises a radially extending shaft 380 and a turn knob 390 for fine tuning the linear offset between the disks 150 and 160. The shaft 380 can be swung about the Z-axis as along arc 135, while the knob 390 turns about a longitudinal axis of the shaft 380 along rotation 195 for fine-tune adjustment for linear translation of the upper disk 160 in relation to the lower disk 150. The knob 390 employs 170 threads-per-inch of turns for translation.

Figure 4A:
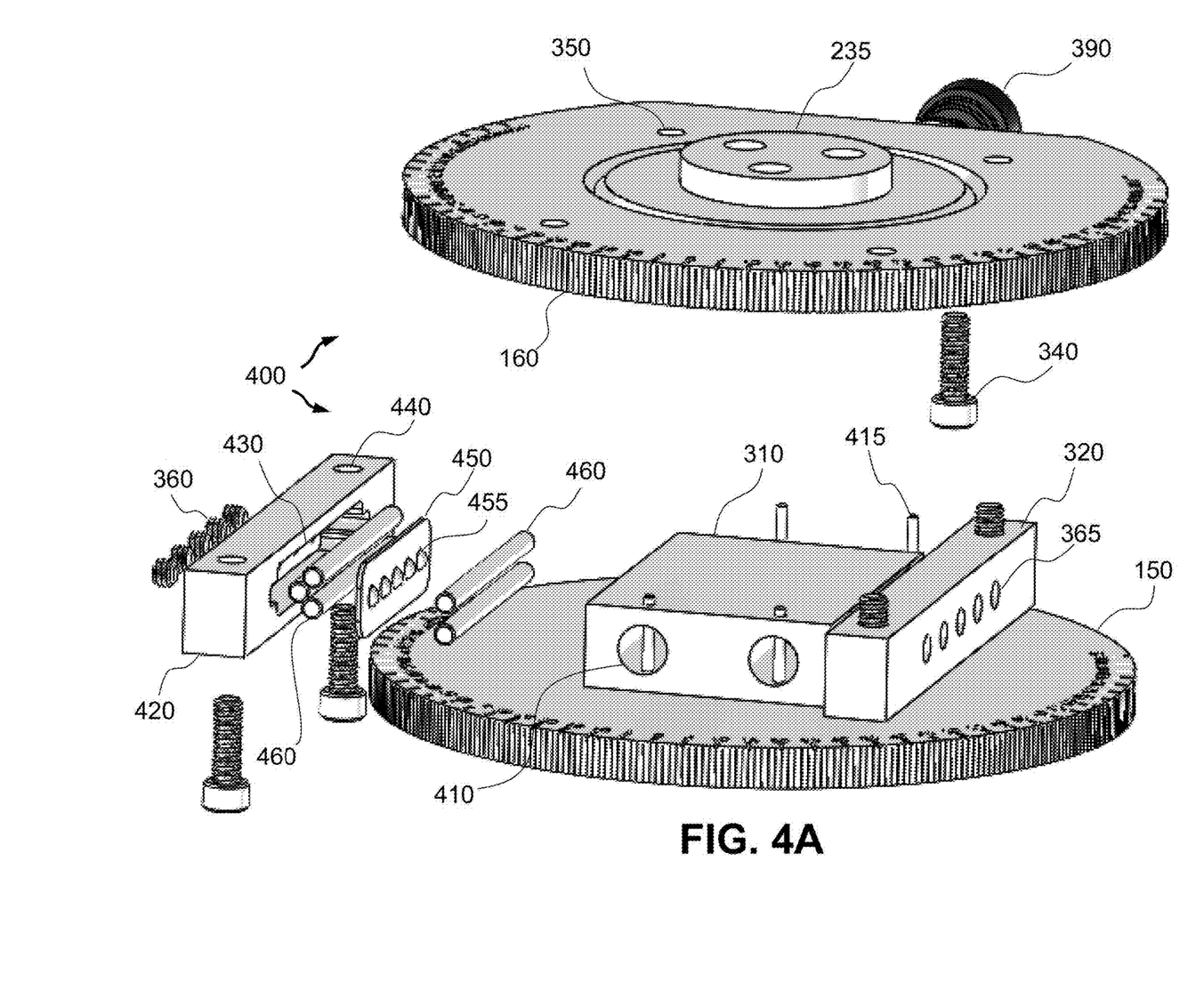
FIGS. 4A and 4B are perspective exploded views of the disks and interface subassembly from above.
Figure 4B:
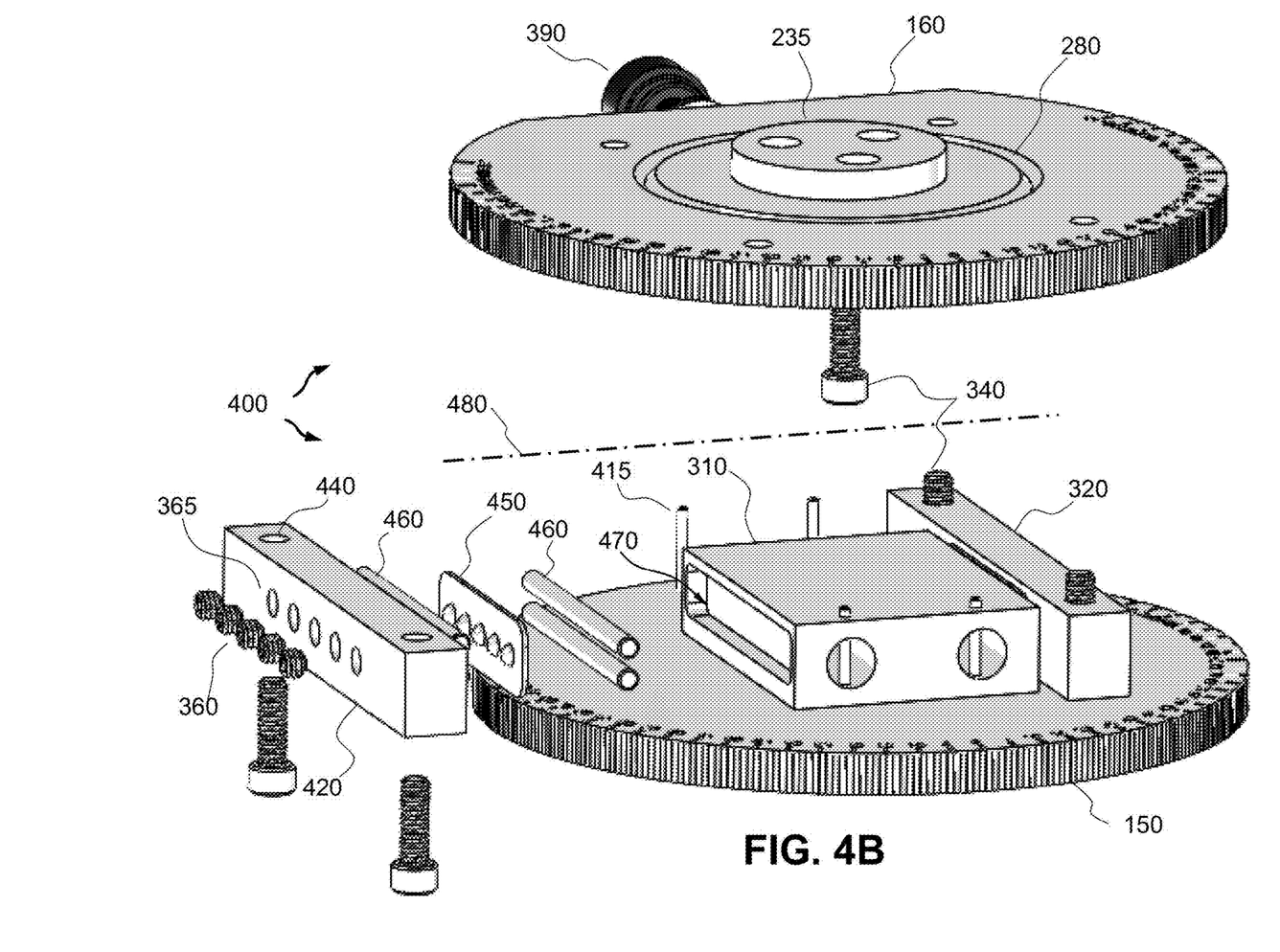

FIGS. 4A and 4B show exploded views 400 of the exploded translational subassembly 130. The midblock 310 includes axial channels 410 and aligns to the lower disk 150 by vertical alignment pins 415 that cross through the channels 410. Each flanking assembly 320 includes flange guide 420 having a bearing cavity 430 and vertical holes 440 adjacent its extremities, a linear bearing sleeve 450 containing ball bearings 455 and a plurality of linear bearing rods 460 contained within the cavities 430. The midblock 310 also includes corresponding cavities 470 that face their respective guides 420 to receive the rods 460, which reduce friction to enable the guides 420 to slide the upper disk 160 in relation to the lower disk 150. The ball bearings 455 permit the rods 460 to slip as they pass while the midblock 310 slides between the guides 420.

Each guide 420 further includes the compressor inserts 360 that insert into corresponding threaded cavities 365 to selectively restrict rotation of the rods 460 upon completion of relative alignment for the disks 150 and 160. Additional screws 340 insert into the vertical holes 440 to secure the flanking assemblies 320 into the upper disk 160. This arrangement connects together the disks 150 and 160, enabling relative translation and rotation until fixed in position by inserts 360 and set screws 175 and 185.

Figure 5A:
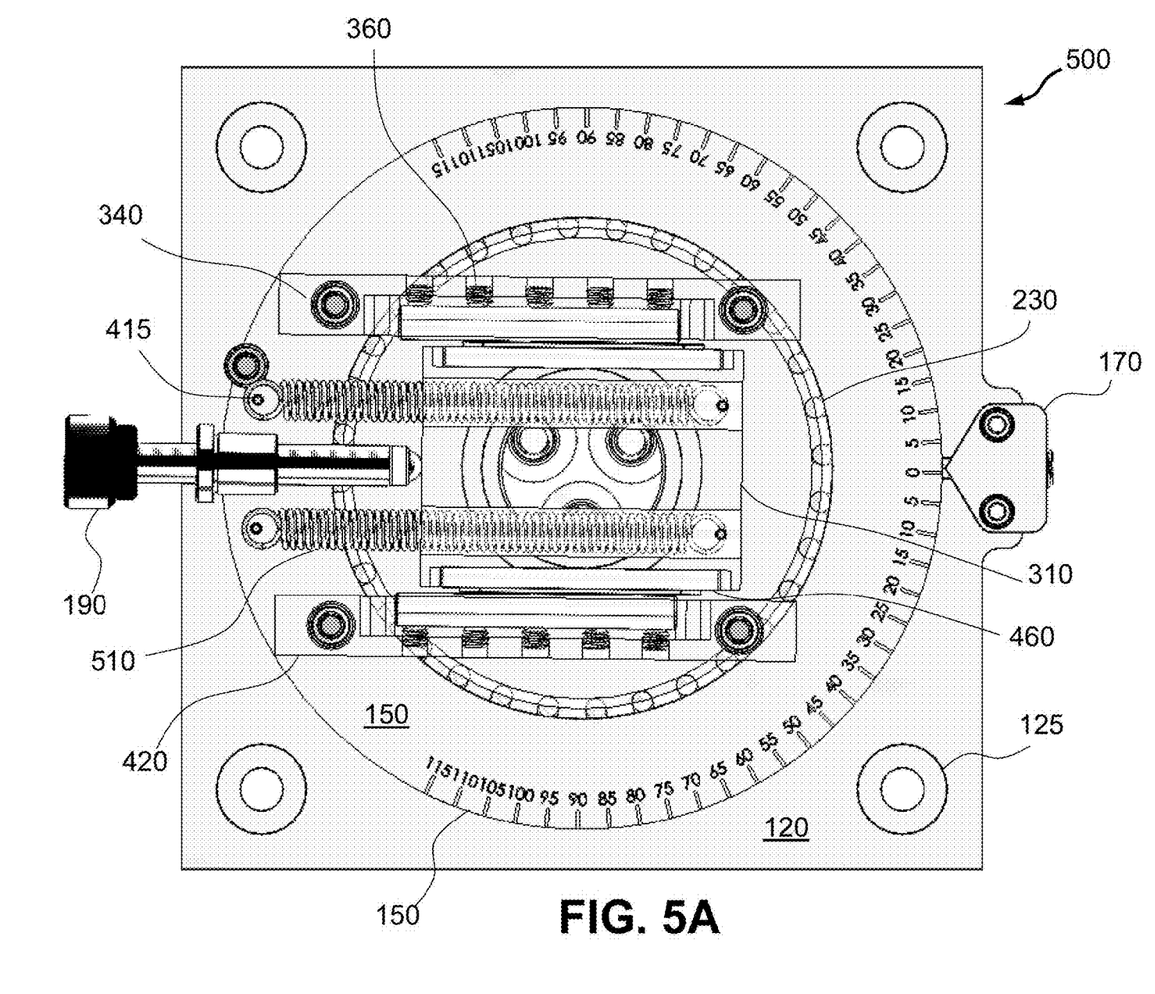
FIG. 5A is a plan view of the components absent the upper disk.
Figure 5B:
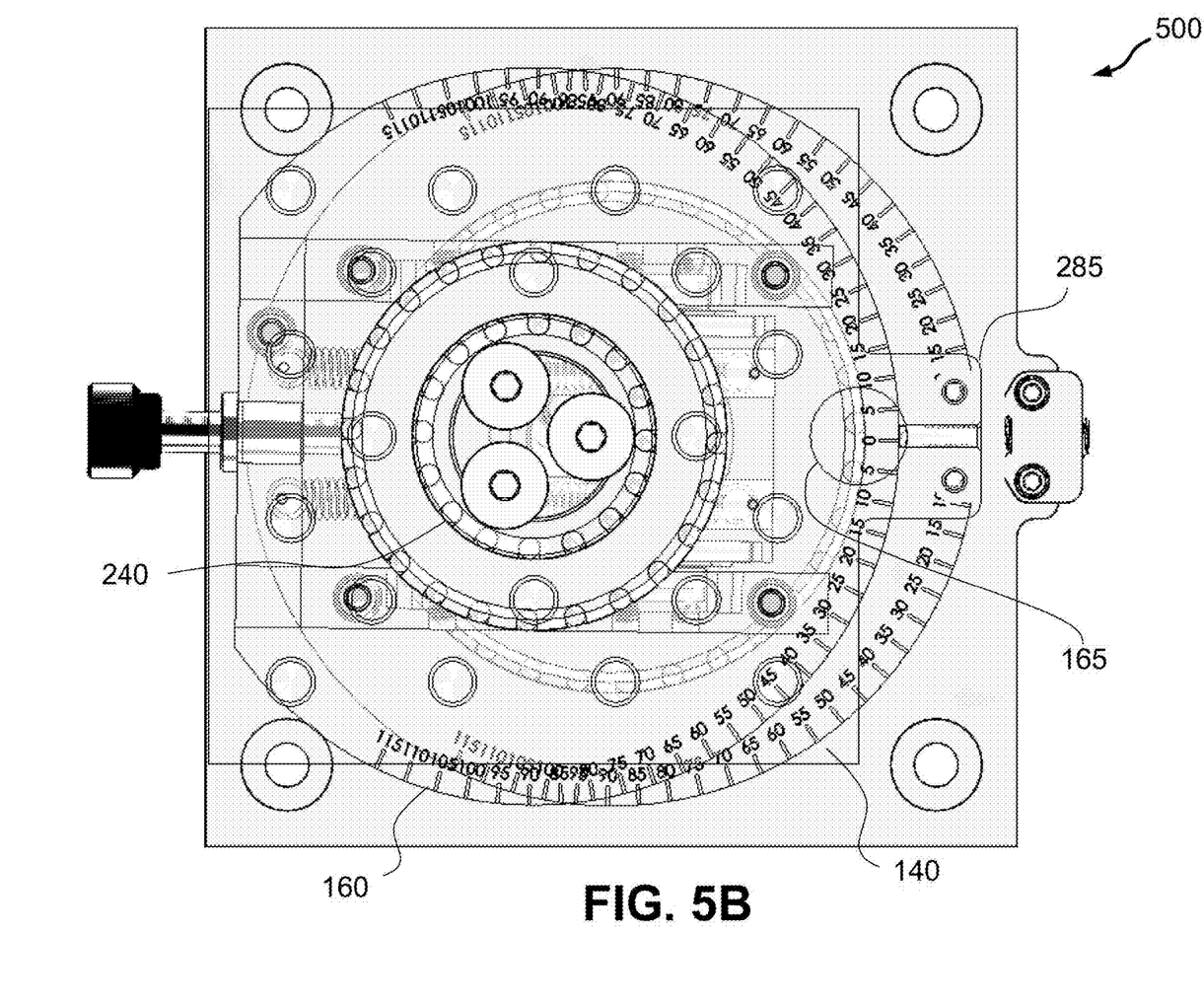
FIGS. 5B and 5C are plan views of the components with the upper disk.
Figure 5C:
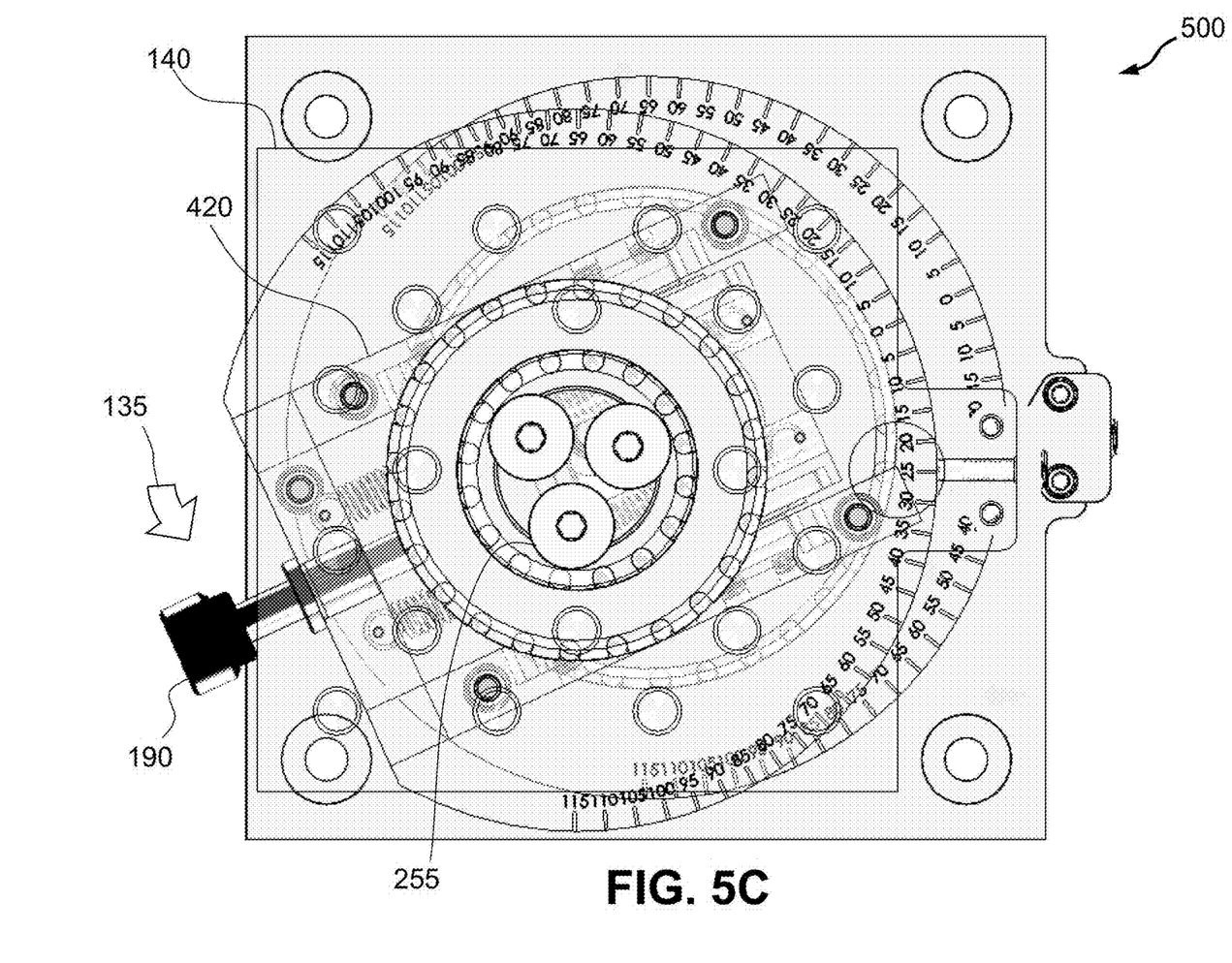

For this configuration, five horizontal rods 460 are provided for each side—two between midblock 310 and the sleeve 450, and three between the sleeve 450 and the guide 420 contained within lateral cavities 430 and 470 to house them. The flange assemblies 320 translate along the lateral axis 480 in relation to the midblock 310. The screws 360 include hexagonal center cavities for turning with a 2 mm allen wrench to tighten against the rods 460 for securing the subassembly 130 from sliding after an intended offset has been established—or to loosen them for further translational adjustment FIGS. 5A, 5B and 5C show plan views 500 of the device 110, with FIG. 5A omitting the upper disk 160 and the top plate 140. The shaft 380 of the arm 190 impinges on the midblock 310. As the knob 390 turns clockwise 195, the shaft 380 and midblock 310 translate forward (towards the left), and oppositely for the other corresponding directions. A pair of helical tension springs 510 extending from inside their corresponding channels 410 in the midblock 310, being anchored at each end by pins 415 on the lower disk 150 and the midblock 310, which slides between its flanking flange guides 420.

After loosening the inserts 360 in the guides 420, sliding friction for the midblock 310 is minimized by the rods 460 in cavities 430 (in the guides 420) and 470 (in the midblock 310) separated by sleeves 450 that house ball bearings 455, enabling touching surfaces to slip. The springs 510 maintain tension on the midblock 310—that tension being counterbalanced by the shaft 380. Note that the index of lower disk 150 that the flange 170 points to approximately zero.

FIG. 5B shows the upper and lower disks 160 and 150, with their center axes 265 and 260 linearly displaced. Note that the index of upper disk 160 in the window 165 also shows approximately zero. By contrast, FIG. 5C shows that the arm 190 has swung 135 anti-clockwise by 25°, rotating the interface subassembly 130 (i.e., the midblock 310 and its flanking subassemblies 320) and the upper disk 160 together. Note that the top plate 140 does not pivot but merely translates slightly aft (to the right). With the arm 190 swung about the axis 265, the index of the upper disk 160 as viewed through the window 165 reads twenty-five, corresponding to the number of degrees of turn.

The top plate 140 can optionally rotate with the upper disk 160, or else remain angularly fixed in relation to the bottom plate 120. To operate the rotation (from no rotation FIG. 5B to rotated FIG. 5C), the arm 190 swings to the desired position as indicated by lower pointing flange 170 on the plate 150 (inherently, 140 would have rotated with the swing rotation using the arm 190). Once the desired position is indicated by pointing flange 170, the lower rotation should be locked using set screw 175.

Upon being locked, the upper plate 140 should be manually rotated until the indication of upper pointing flange 180 matches the originally desired rotation indicated by pointing flange 170. This second rotation causes the positions of bottom and top plates 120 and 140 to be parallel again. Once the second rotation is completed, the upper rotation should be locked using set screw 185. Once locked, translation may be performed as needed for focusing by turning the knob 390 by rotation 195.

Figure 6A:
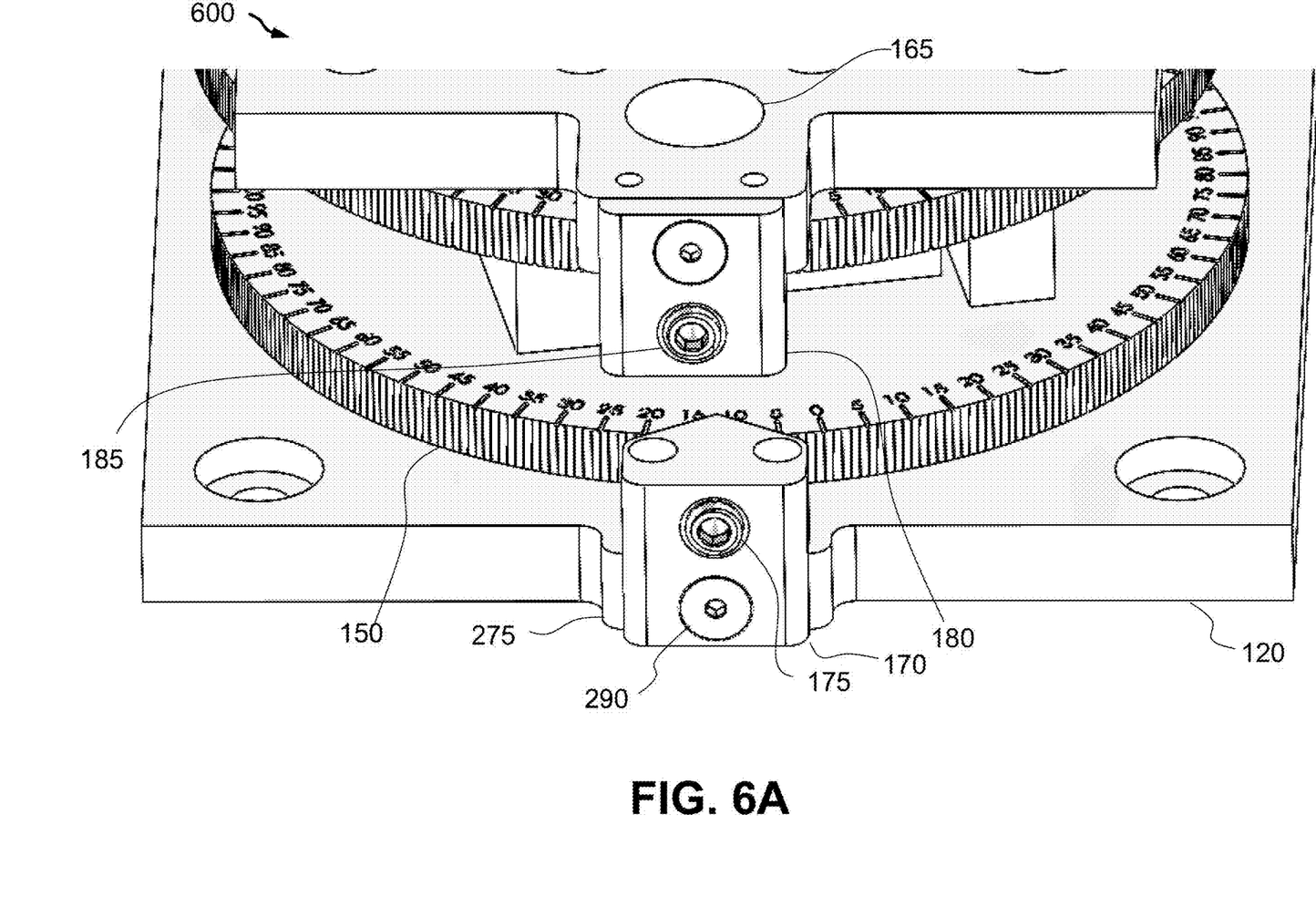
FIG. 6A is a perspective detail view of the components showing indices.
Figure 6B:
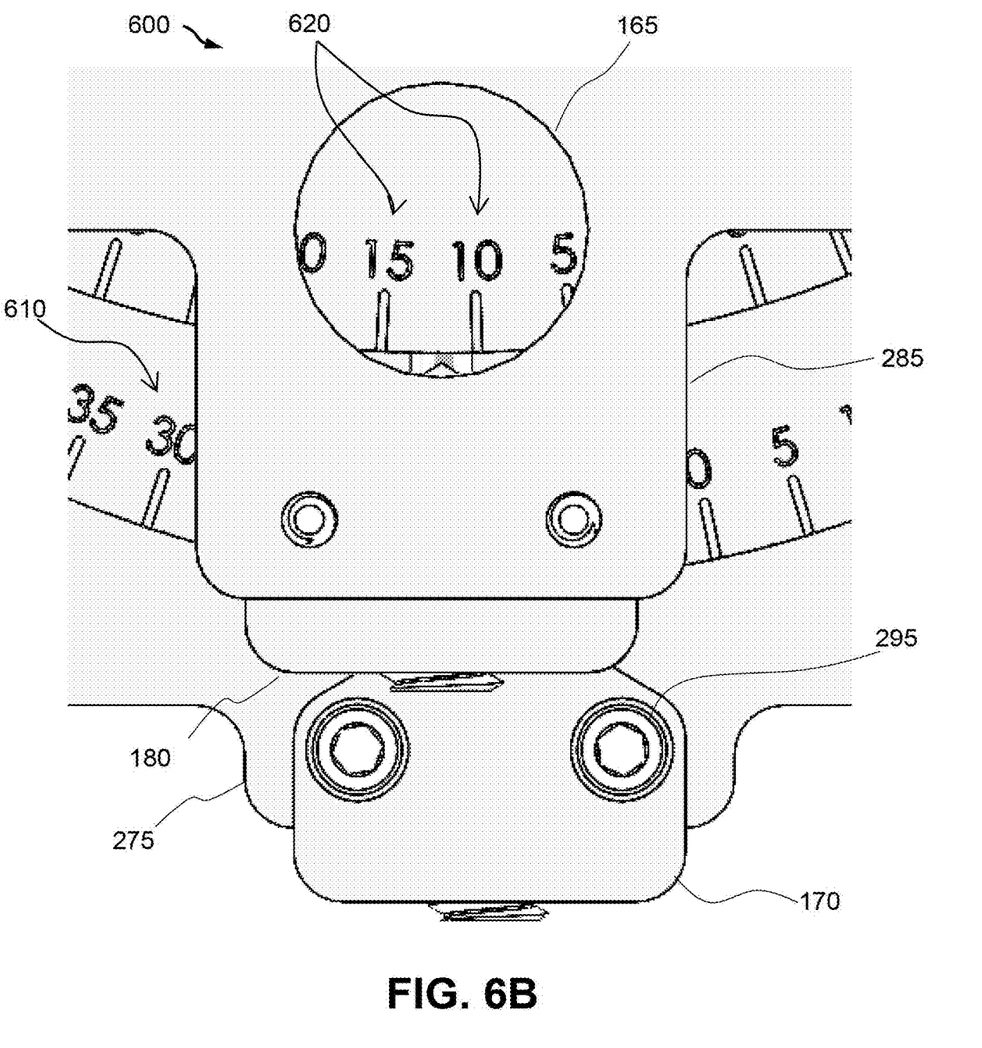
FIG. 6B is a plan detail view of these indices.

FIGS. 6A and 6B show perspective and plan detail views 600 of angular gradients on the optical platform along the peripheries of the disks 150 and 160. The cavity window 165 in the top plate 140 enables an operator to visually read angularly incremented indices on the upper disk 160 as identified by a pointer on the indicator 180. Upon tightening, the set screw 185 inhibits the disk 160 from rotating in relation to the translation subassembly 130. The indicator 170 can be locked relative to the bottom plate 120 by the set screw 175 while pointing to digitized indices on the lower disk 150.

The lower disk 150 features indices 610 along the lower circular periphery, while the upper disk 160 features indices 620 along the upper circular periphery. The particular index being indicated by the upper pointing flange 180 can be observed through the window 165 on the extension flange 285. Most of the indices 620 are obscured by the top late 140. The exemplary optical platform 110 or Rotating Axis Translational Optical Adjuster has been designed for an off-axis parabola (OAP) laser weapon system program, because no feasible options currently exist for accurate OAP angular focusing. An OAP mirror deflects an incoming laser beam, such as by 45° and focuses the rays of that beam onto a focal point offset from the beam's direction.

FIGS. 7A, 7B, 7C and 7D show plan views 700 of the platform 110, omitting the top plate 140. FIG. 7A shows an initial configuration 710 without rotation or translation. The bottom plate 120 supports the lower disk 150 on which the midblock 310 is disposed. The upper disk 150 above the midblock 310 includes the rotation guide 235 with which the plate 140 interfaces, as well as the arm 190. FIG. 7B shows a secondary configuration 720 with translation but absent rotation. Turning the knob 390 clockwise 195 causes the midblock 310 to translate forward 750 in relation to the coordinates 115 by an aligned (and exaggerated) offset distance 760.

This operation also translates the upper disk 160 while the lower disk 150 remains stationary, thereby separating their respective rotation axes 265 and 260. FIG. 7C shows a tertiary configuration 730 after rotation. With release of the set screw 175, the arm 190 can be swung by an aligned rotational angle 770 along arc 135 in for example a clockwise direction. FIG. 7D shows a quaternary configuration 740 after rotation followed by translation. With loosening of the inserts 360, the midblock 310 can be translated in for example a rightward forward direction 780 by an aligned (and exaggerated) distance 790. The upper disk 160 translates accordingly in relation to the lower disk 150.

Figure 8:
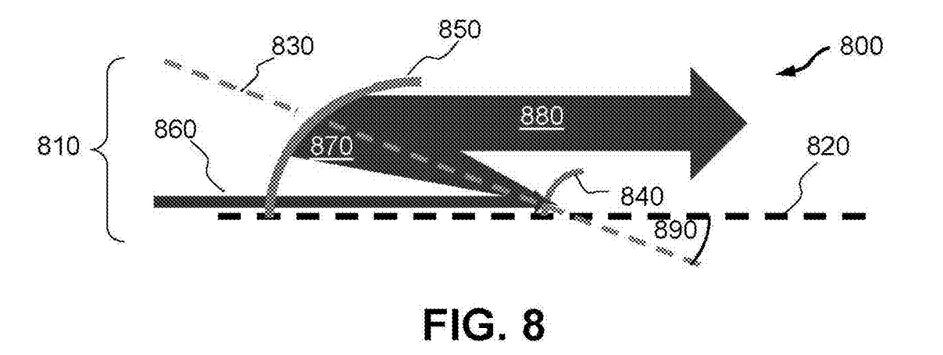
FIG. 8 is a schematic view of a laser alignment configuration.

FIG. 8 shows a schematic view 800 of an off-axis parabola (OAP) laboratory configuration description geometry 810 for laser deflection testing. This configuration features a main beam path 820 and a focal path 830. The hardware includes secondary and primary OAP mirrors 840 and 850. The secondary mirror 840 has a concave shape, while the larger primary OAP has a convex shape.

A laser sends a narrow light beam 860 along the path 820, which is reflected and spread by the first OAP 840 along the focal path 830 towards the second OAP 850, which reflects the broadened beam 860 parallel to and laterally offset from the path 820. In order to properly provide for adjustments, the exemplary platform 110 enables separate rotations to be linearly offset from each other to facilitate alignment.

To mitigate mechanical interferences resulting from axially-aligned parabolic beam expander geometry, OAP geometry is used in many high-energy lasers and optical systems. To drive design, laboratory testing is needed to ensure correct dimensions and tolerancing are applied to the OAP geometry and mounts. The Rotating Axis Translating Optical Adjuster design is crucial for this testing due to being the only design capable of translating the Secondary OAP along the Focal Path while being mounted and oriented along the Main Beam Path.

Figure 9A:
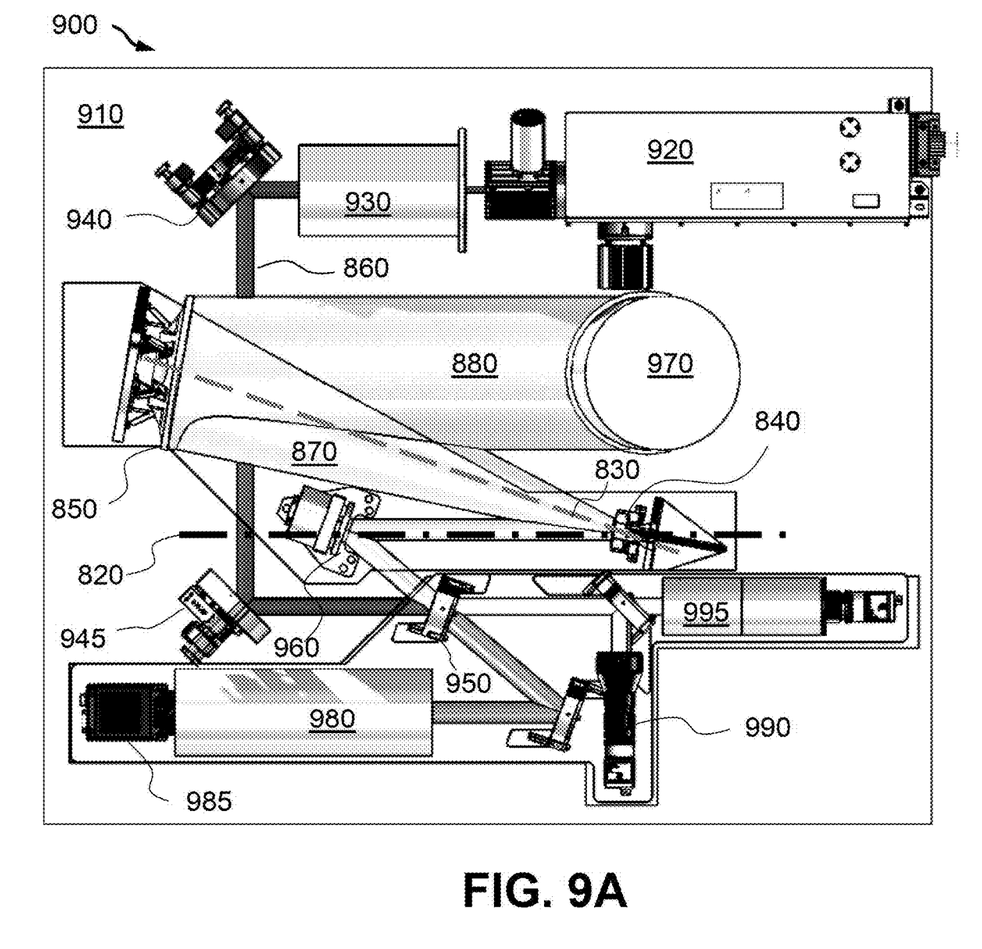
FIGS. 9A and 9B are respective plan and perspective views of a laser alignment test stand.
Figure 9B:
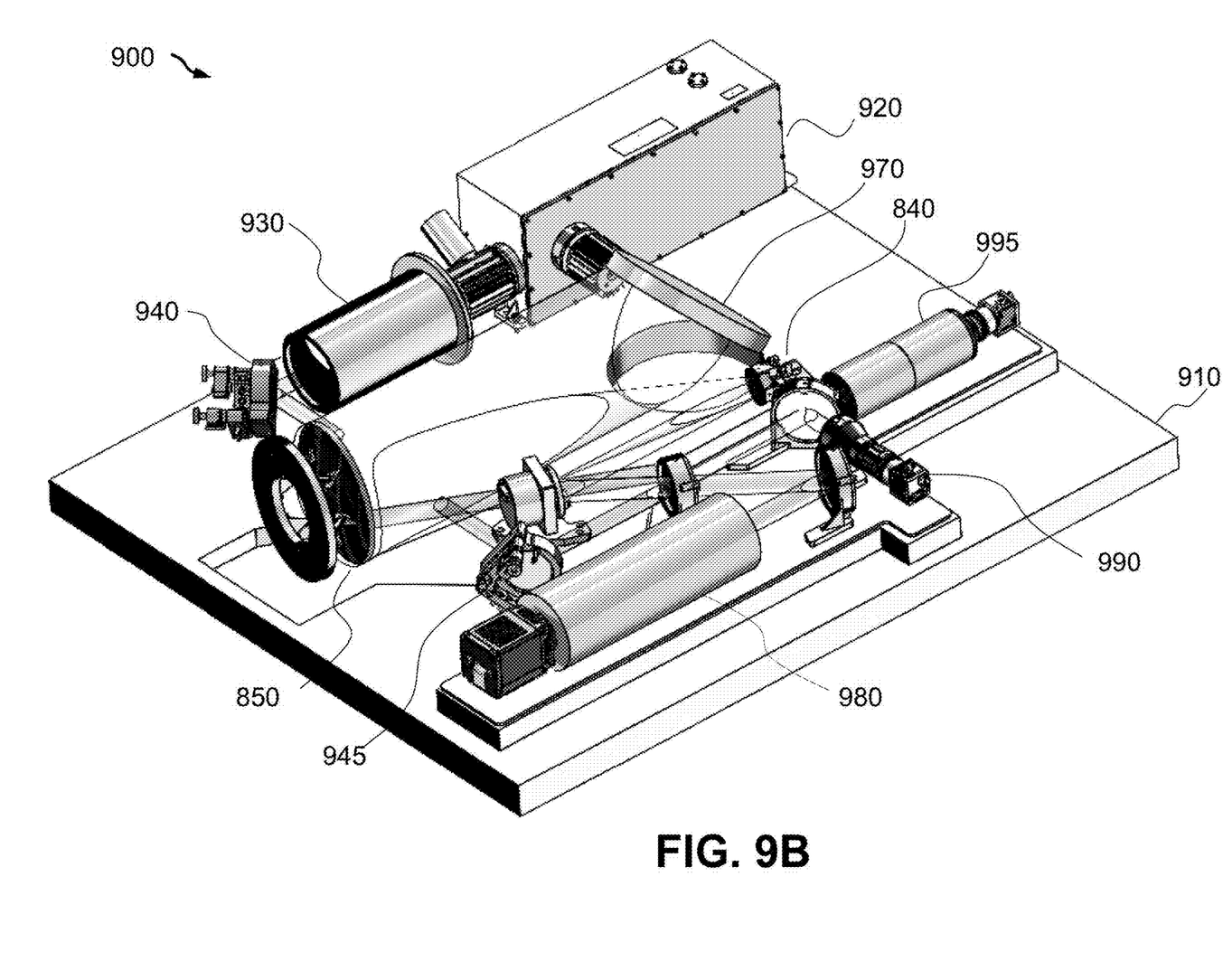

FIGS. 9A and 9B show respective plan and perspective views 900 of laser alignment system mounted to a table bench 910 onto which an exemplary platform 110 can be attached via its mount holes 125. A laser 920 emits light passing through a spreader 930 to pass the beam 860, which is deflected by mirrors 940 and 945 until reaching a beamsplitter 950. A mirror 960 redirects one divided beam towards the secondary OAP mirror 840. The broadened beam 870 then reflects off the primary OAP mirror 850 into a spread parallel beam 880 towards a canted detector mirror

970. Auxiliary equipment mounted to the table 910 include short wavelength infrared (SWIR) focusing system 980, SWIR camera 985, tilt sensor 990 and spatial sensor 995 that also receive the other divided beam.

Figure 10:
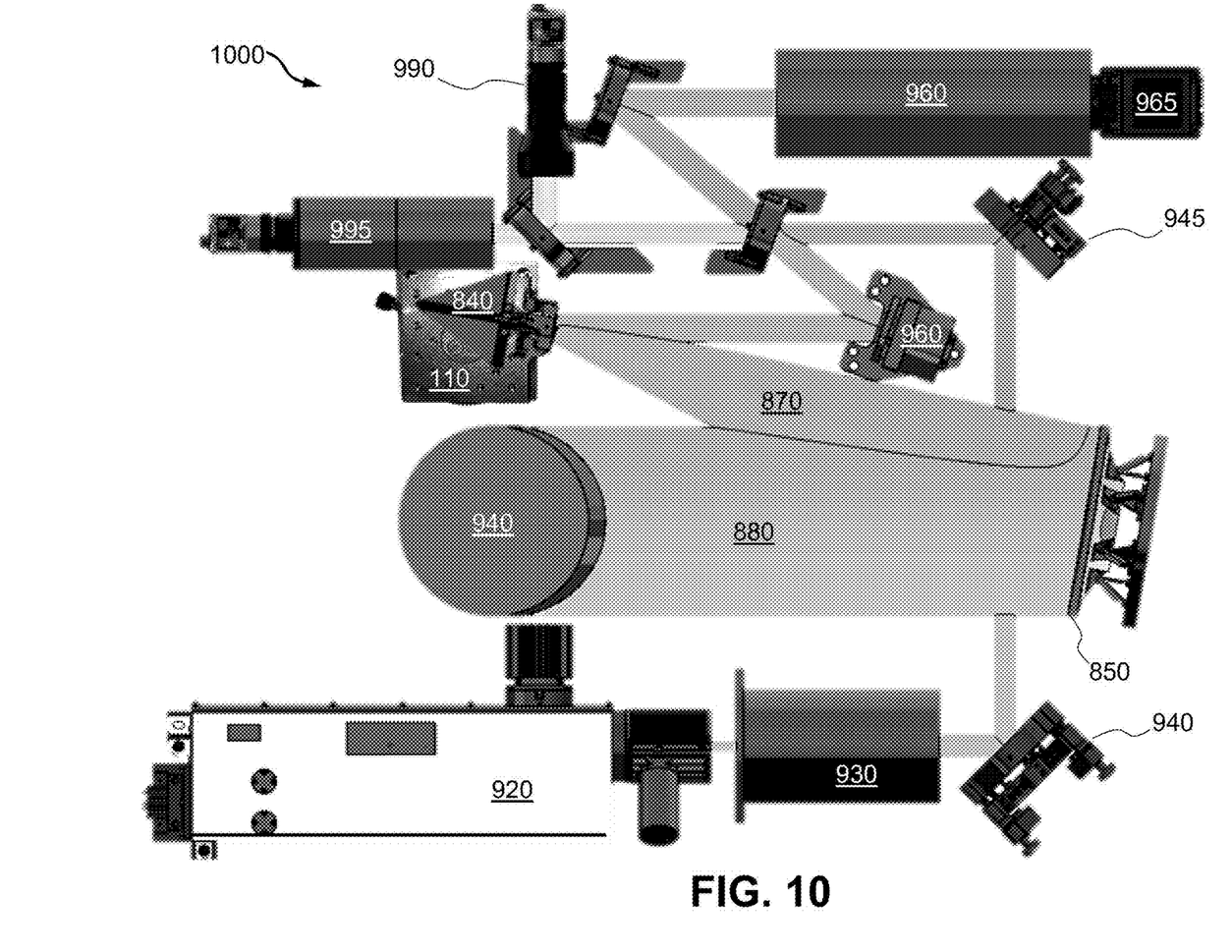
FIG. 10 is a plan view of a laser alignment configuration with the exemplary platform.

FIG. 10 shows a plan view 1000 of the laser alignment configuration 910 with the exemplary optical platform 110. The secondary OAP mirror 840 mounts to the platform 110 so as to be precisely aligned by angular turning and translation. This enables the beam 870 to be directed with precision to the primary OAP mirror 850 and to the detector mirror 970.

Conventional adjustment methods for translating along a specified axis include the following operations and their limitations:
- (1) manually rotating the translational stage to the desired angle of the linear translation axis. This leads to the following disadvantages:
  - (a) accuracy of angle is decreased with this method since a protractor is used to measure the angle between the adjustment stage and a reference line;
  - (b) stability of optic is decreased because the axis angle is secured by a single tensioned bolt;
  - (c) this option is not feasible for accurate OAP focusing.
- (2) adjusting the X and Y axes of the translational stage using steps to mimic linear translation along a specified axis:
  - (a) accuracy of angle is decreased because simultaneous precision adjustments are needed to actuate the optic linearly as well as angularly;
  - (b) adjusting the X and Y axes to obtain the desired distance and angle parameters is extremely difficult for the necessary precision;
  - (c) this option enables optical placement, but OAP focusing is impossible with this method.

By contrast, using the exemplary platform 110, the operator merely needs to rotate the translational assembly to the desired angle tic mark on the pointer flange 180, fasten the rotational arrest screws 175 and 185, and adjust as desired along the angled axis. These include:
- (a) accuracy of the axis angle and translation distance are improved with the exemplary platform 110.
- (b) stability of optic device (i.e., OAP mirror 840) is enhanced.
- (c) this design is much simpler and easier to use than conventional techniques.

The top plate 140, translational subassembly 130, and the bottom plate 120 are all able to rotate independently when the rotation-locking set screws 175 and 185 are disengaged. The top and bottom plates 140 and 120 rotate along the respective axes 265 and 260 of the upper and lower disks 160 and 150 respectively. The arm 190 translates upper and lower disks 160 and 150 linearly with respect to each other along the axis 380.

The pattern of alignment holes 145 on top plate 140 is threaded ¼-20 for standard optical fasteners. Holes 125 on bottom plate 120 are through holes 4" apart, designed for fastening to standard optics bench 710 using ¼-20 fasteners. Pointed edges on lower and upper pointer flanges 170 and 180 are used to indicate degree markings on upper and lower position indicating disks 150 and 160.

Operational rotation can be summarized as follows: The top plate 140 interfaces with the upper disk 160 using the ball bearings 230 that engage groove races 280 on the top plate 140 and upper disk 160 to double as thrust and radial load bearers. Rotation interface enables the top plate 140 and upper disk 160 to rotate about the upper axis 265. The pointer flange 180 can be securely fastened to the top plate 140 along the extension flange 285 by the screw 290.

The set screw 185 provides a mechanism between upper pointer 180 and top plate 140 to provide the operator options to arrest or permit the rotational motion between top and bottom plates 140 and 120. As previously noted, the pointed edge on the flange 180 is used to indicate angular markings 620 on upper disk 160. The bottom plate 120 interfaces with the lower disk 150 using the ball bearings 220 that engage the races 215 on the lower disk 150 and the bottom plate 120 to double as thrust and radial load bearers.

The translation subassembly 130 enables the lower disk 150 and the top plate 120 to rotate about the lower axis 260. The lower disk 150 can be securely fastened to bottom plate 120. The set screw 175 provides a mechanism between lower pointer 170 and bottom plate 120 to provide the operator options to arrest or permit the rotational motion between lower disk 150 and the bottom plate 120. As previously noted, the bevel edge on lower pointer 170 is used to indicate angular markings 610 on lower disk 150.

Overview of translational operations can be summarized as follows: The roller bearing rods 360 are securely and permanently fastened to the upper disk 160, and the subassembly 130 with the lower disk 150. The subassembly 130 between the upper and lower disks 160 and 150 permits them translate freely along the lateral axis 380. The knob 390 on the arm 190 enables the operator to translate these disks 160 and 150 with respect to each other with smooth, precise motion. Clockwise turning as indicated by rotation 195 causes the upper disk 150 to translate in the direction towards the knob 390. To eliminate backlash and enhance stability of the translational actuation, springs 510 interface between disks 160 and 150 passing through the holes 410 in the midblock 310 and connecting to the pins 415 induce pretension against arm 190.

Overview of operations for the exemplary platform 110 include:
- (1) Fasten the bottom plate 120 to the optical bench 710 using holes 125.
- (2) Fasten optic to the top plate 140 using the alignment holes 145.
- (3) Loosen the set screw 175 in the lower pointer flange 170 to permit rotation of the lower disk 150.
- (4) Rotate the subassembly 130 to desired angle indicated by the lower pointer flange 170.
- (5) Fasten the set screw 175 indicated in lower pointer flange 170.
- (6) Loosen the set screw 185 in the upper pointer flange 180 to permit rotation of the top plate 140.
- (7) Rotate the top plate 140 to desired angle indicated by the pointer flange 180.
- (8) Fasten the set screw 180 indicated in the pointer flange 180.
- (9) Translate optic as necessary along specified axis 380 using the arm 190.

Using the Rotating Axis Translational Optical Adjuster platform 110, the operator simply needs to rotate the translational assembly via the arm 190 to the desired angle tic mark 620, fasten the rotational set screws 175 and 185, and adjust as desired along the angled axis. This has the advantages of improving accuracy of the axis angle 770 and translation distance 760 with this design, stability of optic is enhanced, and greater simplicity to implement than conventional methods.

The sandwich placement of the translational stage subassembly 130 between the rotational components disks 150 and 160 as single unit enables this exemplary platform 110 the unique capability of OAP focusing that is not currently a capability of any commercially produced optics adjusters. This exemplary platform 110 significantly improves beam quality for fielded laser weapon systems by enhancing laboratory testing capabilities and thereby decreases time needed for engineering of the optical train resulting in faster delivery of the capability to the warfighter.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A platform for aligning and securing an instrument, and being attachable to a mount stand for angularly aligning plural independent and parallel rotations separated by linear offset, said platform comprising:
   a first plate for attaching to the mount stand;
   a first disk disposed onto said first plate, and rotatable on a first axis;
   a linear translation assembly, including a block flanked by a pair of flanges, each flange of said pair of flanges being disposed on said first disk;
   a second disk disposed onto said block, and rotatable on a second axis parallel to said first axis, wherein said block slides to translate relative to said pair of flanges; and
   a second plate for attaching to said second disk and receiving the instrument.

2. The platform according to claim 1, further including a tension spring that connects said block to said first disk.

3. The platform according to claim 2, wherein said second disk includes an extension that supports an arm to push against said block to said first disk.

4. The platform according to claim 1, wherein said second disk includes a plurality of gradient marks along their peripheries to indicate angular rotation.

5. The platform according to claim 4, wherein said second disk includes a window to observe a point mark among said plurality of gradient marks.

6. The platform according to claim 1, further including a pair of sleeves between each flange and said block on either side, each sleeve supporting a plurality of ball bearings.

7. The platform according to claim 6, wherein said block further includes an inner rod on said either side, and said each flange further includes an outer rod, such that said ball bearings impinge against said inner and outer rods.

8. The platform according to claim 1, wherein said first plate and said first disk include annular races to enable ball bearings to roll therebetween.

9. The platform according to claim 1, wherein said second disk and said second plate include annular races to enable ball bearings to roll therebetween.

10. The platform according to claim 1, wherein said first disk includes an axial guide protrusion that inserts into a corresponding hole in said first plate.

11. The platform according to claim 1, wherein said second disk includes an axial guide protrusion that inserts into a corresponding hole in said second plate.

12. The platform according to claim 1, further including a first set screw to inhibit said first disk from rotating on said first plate.

13. The platform according to claim 12, further including a second set screw to inhibit said second disk from rotating on said first disk.

14. The platform according to claim 1, wherein said each flange includes an insert screw that impinges against said block to inhibit translation.

* * * * *